(12) United States Patent
Agata et al.

(10) Patent No.: US 10,216,137 B2
(45) Date of Patent: Feb. 26, 2019

(54) OPENING-CLOSING MEMBER DETECTING DEVICE AND IMAGE FORMING APPARATUS

(71) Applicant: CANON KABUSHIKI KAISHA, Tokyo (JP)

(72) Inventors: Jun Agata, Suntou-gun (JP); Joji Goto, Susono (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/867,042

(22) Filed: Jan. 10, 2018

(65) Prior Publication Data
US 2018/0203406 A1   Jul. 19, 2018

(30) Foreign Application Priority Data

Jan. 17, 2017 (JP) ................. 2017-006182
Nov. 8, 2017 (JP) ................. 2017-215704

(51) Int. Cl.
| | |
|---|---|
| G03G 15/00 | (2006.01) |
| G03G 21/16 | (2006.01) |
| G11B 15/675 | (2006.01) |
| G11B 33/02 | (2006.01) |

(52) U.S. Cl.
CPC ......... *G03G 21/1638* (2013.01); *G03G 15/55* (2013.01); *G03G 15/605* (2013.01); *G03G 21/1633* (2013.01); *G11B 15/675* (2013.01); *G11B 33/02* (2013.01); *G03G 2215/00177* (2013.01)

(58) Field of Classification Search
CPC ............ G03G 15/605; G03G 21/1638; G03G 21/1623; G03G 21/1633; G03G 2215/00177; G03G 15/55; G11B 15/675; G11B 33/02
See application file for complete search history.

(56) References Cited

U.S. PATENT DOCUMENTS

2015/0185686 A1* 7/2015 Matsuno ............ G03G 21/1633
                                                    399/110

FOREIGN PATENT DOCUMENTS

| JP | S60-123929 U | 8/1985 |
| JP | H09-091807 A | 4/1997 |
| JP | H11-110861 A | 4/1999 |

* cited by examiner

*Primary Examiner* — Hoang X Ngo
(74) *Attorney, Agent, or Firm* — Venable LLP

(57) ABSTRACT

The device of the present invention includes a frame that supports a switch and a link provided between an opening-closing member and the switch. The link has a first fulcrum forming portion supported at a first support portion of the frame to form a first fulcrum, a power-point portion pushed by the opening-closing member, a second fulcrum forming portion supported at a second support portion of the frame to form a second fulcrum, and a switch operation portion that presses the switch. The first fulcrum forming portion is separable with respect to the first support member. An urging member for urging the link is provided, with the urging member urging the first fulcrum forming portion toward the first support portion.

20 Claims, 13 Drawing Sheets

OPENING-CLOSING MEMBER DETECTING DEVICE AND IMAGE FORMING APPARATUS

BACKGROUND OF THE INVENTION

Field of the Invention

The present invention relates to an opening-closing member detecting device that detects an opened-closed state of an opening-closing member, and more particularly to an opening-closing member detecting device and an image forming apparatus that include a mechanism for absorbing overstroke of an opening-closing member when a switch is operated with closing operation of the opening-closing member.

Description of the Related Art

A conventional opening-closing member detecting device of this kind is known for example from Japanese Patent Application Publication No. H09-91807. In the configuration disclosed in Japanese Patent Application Publication No. H09-91807, an opened-closed state of a lid body (opening-closing member) that pivotably opens/closes with respect to the main body of the device is detected by operating a switch synchronously with closing-opening operation of the lid body. In order to absorb overstroke of the lid body, a torsion spring used to constantly urge the lid body in the opening direction is made conductive, and the switch is made of an electric contact that conducts when contacted by the torsion spring.

Japanese UtilityModel Application Publication No. S60-123929 discloses an overstroke absorbing device for a switch though the device is not an opening-closing member detecting device. The device includes an urging member that urges an attachment substrate at which the switch is attached in a prescribed direction and a switch operation member that operates an operation piece of the switch. When the switch is operated and force that is not less than operation force is applied on the operation piece, the attachment substrate is rotated against the urging force of the urging member, so that overstroke of the switch operation member is absorbed.

Japanese Patent Application Publication No. H11-110861 discloses a tray loading mechanism for a recording/reproducing device in which a tray is advanced/withdrawn into/from the front surface of a device main body, and the document describes an absorbing mechanism for overstroke caused when a driving motor is stopped in the withdrawn position of the tray. More specifically, in order to prevent the switch from being over-pressed, a groove for guiding a switch operation member is provided with a groove for escape so that the switch operation member is guided obliquely downward from the horizontal direction, whereby overstroke is absorbed.

SUMMARY OF THE INVENTION

However, in the configuration disclosed in Japanese Patent Application Publication No. H09-91807, since a switch contact portion is exposed to the outside as the lid body is opened-closed, the contact portion may collect contaminant or become rusty and the conduction of the contact portion may not be guaranteed.

In the disclosure of Japanese Utility Model Application Publication No. S60-123929, since a component with a large moment such as an attachment substrate is swingably supported without being fixed, the configuration may be vulnerable to distribution impact given for example during transport, and a separate impact measure would be necessary. Depending upon how signal wires to be connected to the attachment substrate are stiffened, the stiffness of the wires may prevent desired operation, and therefore a dedicated wire guide or the like may be necessary, which can raise the cost.

In the configuration adapted to absorb overstroke using the guide groove for escape as in Japanese Patent Application Publication No. H11-110861, the pressing direction is shifted but overstroke is not completely absorbed. The direction change by the guide groove for absorbing overstroke of a slider is carried out while the switch is pressed, a load is applied on the contact of the switch itself, which may damage the switch.

In particular, when a switch such as a micro-switch with a narrow on/off operation range is used to detect an opening-closing member, even only a small deviation in the size of related parts may cause on/off operation to be difficult. This necessitates strict part size management, which affects the yield in the manufacture of parts or increases the management cost.

The present invention was made to solve the above problems associated with conventional techniques, and it is an object of the present invention to provide an opening-closing member detecting device and an image forming apparatus with high reliability that can surely absorb overstroke of an opening-closing member and provide a high degree of freedom in designing.

In order to achieve the object describe above, an opening-closing member detecting device according to an embodiment of the present invention is an opening-closing member detecting device that operates a switch with opening-closing operation of an opening-closing member and detects an opened-closed state of the opening-closing member, the opening-closing member detecting device comprising:

a frame that supports the switch;

a link provided between the opening-closing member and the switch; and urging member for urging the link, the link having a first fulcrum forming portion supported at a first support portion of the frame to form a first fulcrum, a power-point portion pushed by the opening-closing member, a second fulcrum forming portion supported at a second support portion of the frame to form a second fulcrum, and a switch operation portion that presses the switch, the frame having a regulating portion that regulates movement of the switch operation portion in a direction of pressing the switch, the first fulcrum forming portion being separable with respect to the first support portion, the urging member urging the first fulcrum forming portion toward the first support portion, the link being pushed at the power-point portion by the opening-closing member to move in a direction, in which the switch operation portion presses the switch, around the first fulcrum serving as a fulcrum, while movement of the switch operation portion in a direction of pressing the switch is regulated by the regulating portion, the link being pushed at the power-point portion by the opening-closing member to move around the second fulcrum serving as a fulcrum in a direction of separating the first fulcrum forming portion from the first support portion against the urging member.

In order to achieve the object describe above, an opening-closing member detecting device according to an embodiment of the present invention is an opening-closing member detecting device that operates a switch with opening-closing operation of an opening-closing member and detects an opened-closed state of the opening-closing member, the opening-closing member detecting device comprising:

a frame that holds the switch;
a link provided between the opening-closing member and the switch; and
urging member for urging the link,
the link having a first fulcrum forming portion supported at a first support portion of the frame to form a first fulcrum, a power-point portion pushed by the opening-closing member, a second fulcrum forming portion provided between the first fulcrum forming portion and the power-point portion and supported at the second support portion of the frame to form a second fulcrum, and a switch operation portion that presses the switch,
the first fulcrum forming portion being separable to the opening-closing member side with respect to the first support portion, the urging member urging the first fulcrum forming portion toward the first support portion,
the switch operation portion being provided in a position of the second fulcrum forming portion.

In order to achieve the object describe above, an opening-closing member detecting device according to an embodiment of the present invention is an opening-closing member detecting device that operates a switch with opening-closing operation of an opening-closing member and detects an opened-closed state of the opening-closing member, the opening-closing member detecting device comprising:

a frame that holds the switch;
a link provided between the opening-closing member and the switch; and
urging member for urging the link,
the link having a first fulcrum forming portion supported at a first support portion of the frame to form a first fulcrum, a switch operation portion that presses the switch, and a power-point portion provided between the first fulcrum forming portion and the switch operation portion and pushed by the opening-closing member,
the first fulcrum forming portion being separable with respect to the first support portion, the urging member urging the first fulcrum forming portion toward the first support portion,
the frame having a regulating portion that regulates movement of the switch operation portion in a direction of pressing the switch.

According to the present invention, the first fulcrum portion can be separated with respect to the first support portion. Therefore, variations in the link or opening-closing member may be absorbed, which improves the degree of freedom in designing. When the opening-closing member may be strongly closed or pressed by some external force, it may be pushed beyond the normal position in the closed state, at this time overstroke occurs. According to the present invention, while movement of the switch operation portion in a direction of pressing the switch is regulated by the regulating portion, the link can move around the second fulcrum serving as a fulcrum in a direction of separating the first fulcrum forming portion from the first support portion against the urging member. Therefore, the link further pushed at the power-point portion at the normal position in the closing state can move around the second fulcrum serving as a fulcrum without having the switch operation portion move in a direction of pressing the switch. In other words, the overstroke does not change the relative positional relationship between the switch operation portion and the switch according to the present invention different from the technique disclosed in Japanese Patent Application Publication No. H11-110861. As described, the present invention may provide an opening-closing member detecting device and an image forming apparatus with high reliability that can surely absorb overstroke of the opening-closing member by movement of the link against the urging member.

Further features of the present invention will become apparent from the following description of exemplary embodiments with reference to the attached drawings.

DESCRIPTION OF THE EMBODIMENTS

Hereinafter, a description will be given, with reference to the drawings, of embodiments of the present invention. However, the sizes, materials, shapes, their relative arrangements, or the like of constituents described in the embodiments may be appropriately changed according to the configurations, various conditions, or the like of apparatuses to which the invention is applied. Therefore, the sizes, materials, shapes, their relative arrangements, or the like of the constituents described in the embodiments do not intend to limit the scope of the invention to the following embodiments.

First Embodiment

Figure 1A:
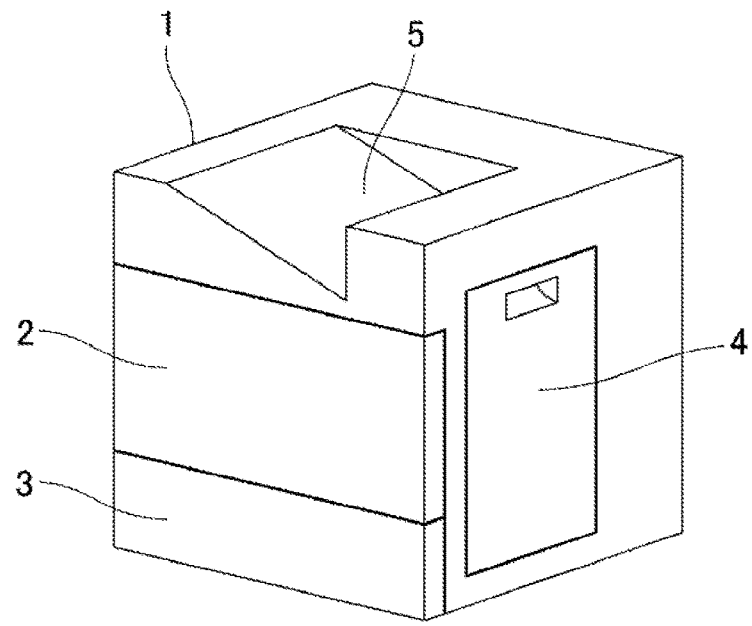
FIGS. 1A and 1B are schematic perspective views of an exemplary image forming apparatus to which the present invention is applied.
Figure 1B:
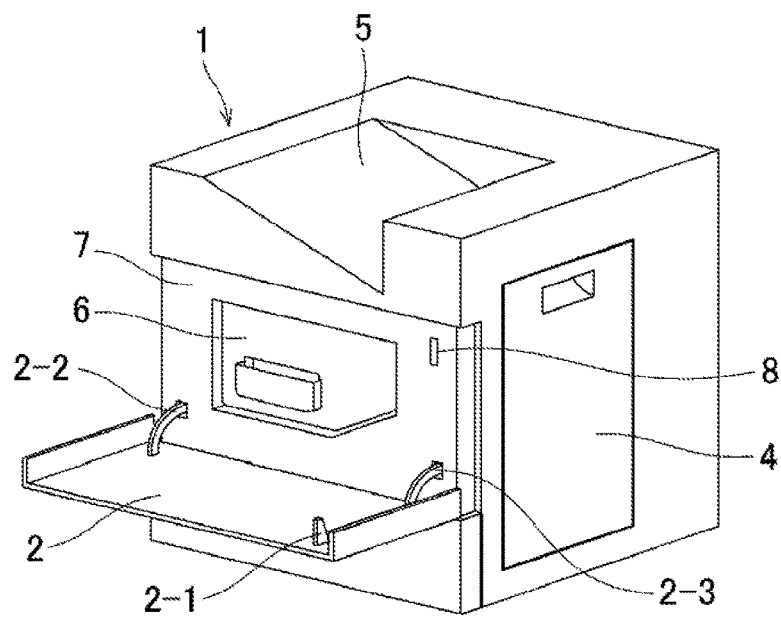

FIGS. 1A and 1B show an image forming apparatus according to a first embodiment of the present invention, FIG. 1A shows a state in which a front cover as an opening-closing member is closed, and FIG. 1B is a perspective view of a state in which the front cover is closed. Image forming apparatuses to which the present invention can be applied include for example electrophotographic or electrostatic copiers and printers.

More specifically, in the image forming apparatus, the front cover 2 that stores a process cartridge 6 including toner, a drum, and a developer is provided in an openable-closable manner at the front of a apparatus main body 1, and a paper feed cassette 3 that stores paper sheets is provided in a forward-drawable manner under the front cover 2. A transport path cover 4 for maintenance of image-forming parts and jam processing is provided at a side surface of the apparatus main body 1, and the upper surface of the apparatus main body 1 is formed as a paper discharge tray 5 on which paper sheets with images formed thereon are stacked.

As shown in FIG. 1B, the front cover 2 is pivotably supported around a lower end side as a pivot fulcrum by hinges 2-2 and 2-3, and when the front cover 2 is opened, the process cartridge 6 can be detached/attached. The process cartridge 6 has it periphery protected by an inside cover 7 and inserted to/pulled out from the apparatus main body 1 on a rail (not shown) formed at the inside cover 7. A striking portion 2-1 as a striking portion is provided at the back surface of the front cover 2, and the inside cover 7 has a slit 8 formed so that the striking portion 2-1 can be inserted therein.

Figure 2:
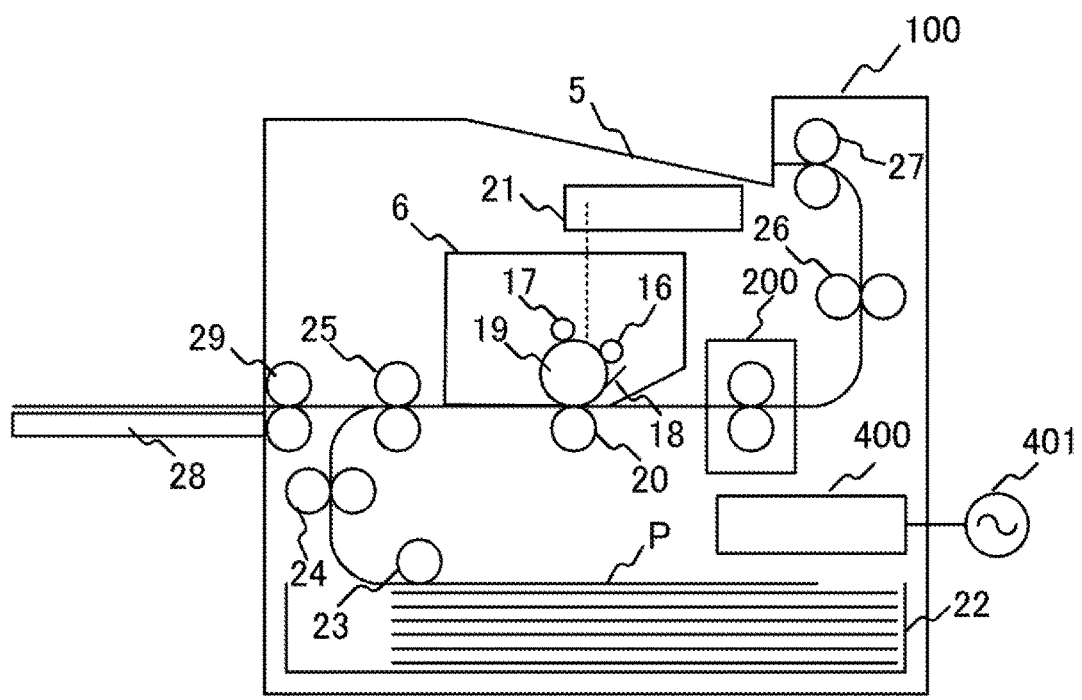
FIG. 2 is a schematic sectional view of an exemplary image forming apparatus to which the present invention is applied.

FIG. 2 is a schematic sectional view of a laser printer 100 as the image forming apparatus 1.

When a print signal is generated, a scanner unit 21 emits a laser beam modulated according to image information, and a photosensitive member 19 charged to have a prescribed polarity by a charging roller 16 is scanned. In this way, an electrostatic latent image is formed on the photosensitive member 19. Toner is supplied from a developer 17 to the electrostatic latent image, and a toner image corresponding to the image information is formed on the photosensitive member 19. The photosensitive member 19, the charging roller 16, and the developer 17 are formed integrally as a process cartridge 15 that includes a toner storing chamber and provided detachably from/attachably to the main body of the laser printer 100. Here, an image forming portion includes the photosensitive member 19, the charging roller 16, and the developer 17. Meanwhile, recording paper sheets P stacked on a feed cassette 22 as a recording medium are fed on a one-sheet basis by a pickup roller 23 and transported to registration rollers 25 by rollers 24. The recording paper sheet P is transported from the registration rollers 25 to a transfer position in timing in which the toner image on the photosensitive member 19 reaches the transfer position formed by the photosensitive member 19 and the transfer roller 20. The toner image on the photosensitive member 19 is transferred onto the recording paper sheet P in the process in which the recording paper sheet P passes the transfer position. Thereafter, the recording paper sheet P is heated by a fixing device 200 as an image heating device that serves as a fixing portion in the image forming apparatus and thermally fixed on the recording paper sheet P. The recording paper sheet P carrying the fixed toner image thereon is discharged onto an upper tray of the laser printer 100 by rollers 26 and 27. Note that the reference numeral 18 designates a cleaner that cleans the photosensitive member 19, and the reference numeral 28 designates a feed tray (bypass tray) having a pair of recording paper sheet regulating plates having a width that is adjustable according to the size of the recording paper sheet P. A feed tray 28 is provided to cope with recording paper sheets P in sizes other than fixed sizes. The reference numeral 29 designates pickup rollers that feed the recording paper sheet P from the feed tray 28. Power is supplied to the fixing device 200 from a control circuit 400 connected to a commercially available alternate current power supply 401.

Now, with reference to FIGS. 3A and 3B, the opening-closing member detecting device according to the present invention will be described.

Figure 3A:
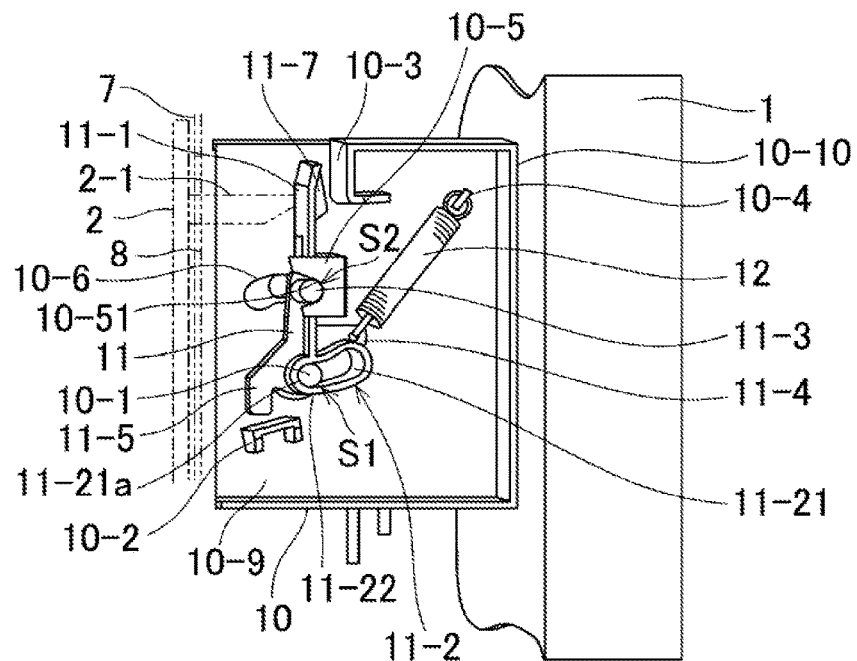
FIGS. 3A and 3B are perspective views of an opening-closing member detecting device according to a first embodiment of the present invention.
Figure 3B:
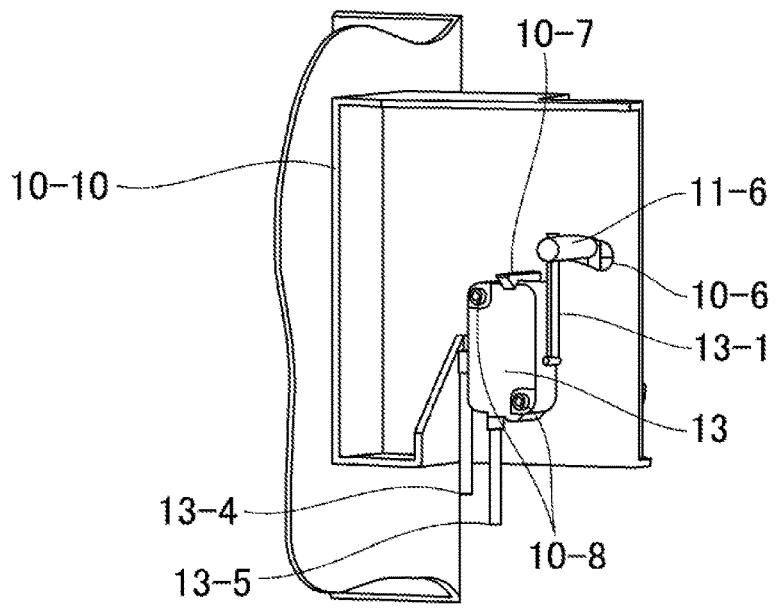

FIG. 3A is a perspective view of the opening-closing member detecting device on the link side of the opening-closing member detecting device, and FIG. 3B is a perspective view on the switch side of the device.

Now, a general configuration will be described.

According to the embodiment, the invention is applied to detection of an opened-closed state of the front cover 2 provided at the apparatus main body 1 in an openable-closable manner, and a switch 13 provided at the apparatus main body 1 is operated with opening-closing operation of the front cover 2, and the opened-closed state of the front cover 2 is detected.

A link 11 is provided between the front cover 2 and the switch 13, and the switch 13 and the link 11 are attached to a holder 10 as a frame fixed on the side of the apparatus main body 1.

The holder 10 has a rectangular partition 10-9 that extends vertically along a surface orthogonal to the rotation axis of the front cover 2, and the switch 13 and the link 11 are provided on the front and back sides of the partition 10-9, respectively. A flange portion 10-10 that protrudes in the left-right direction is provided at a rear side edge of the partition 10-9, and the flange portion 10-10 is then fixed to a wall surface of the apparatus main body 1.

The link 11 is a long plate member that extends linearly in the up-down direction and has a first fulcrum forming portion 11-2, a pressing portion 11-1 as a power-point portion pressed by the front cover 2, and a second fulcrum shaft 11-3 as a second fulcrum forming portion.

The first fulcrum forming portion 11-2 is positioned at one end of the link 11, the lower end in the figure and supported at the first fulcrum shaft 10-1 as a first support portion to form a first fulcrum S1. The second fulcrum shaft 11-3 is provided between the first fulcrum forming portion 11-2 and the pressing portion 11-1 and supported at a holding portion 10-5 provided at the holder 10 as a second support portion and a regulating portion to form a second fulcrum S2.

The first fulcrum forming portion 11-2 can be separated to the side of the front cover 2 as the opening-closing member side with respect to the first fulcrum shaft 10-1 and is provided with a tension spring 12 as urging member for pressing the first fulcrum forming portion 11-2 against the first fulcrum shaft 10-1. An operation shaft 11-6 as a switch operation portion that presses the switch 13 is provided in the position of the second fulcrum shaft 11-3. The operation shaft 11-6 has a circular sectional shape around the second fulcrum S2 and its abutment portion against the switch 13 is in an arc shape.

The structures of the elements will be described in detail.

The pressing portion 11-1 is formed by a surface of an upper part of the link 11 on the side of the front cover 2 and abutted against by the tip end of the striking portion 2-1 that advances as closing operation of the front cover 2 proceeds.

The first fulcrum forming portion 11-2 is provided at one end of the link 11, the lower end in the illustrated example and has an elongate hole 11-21. The elongate hole 11-21 extends for a prescribed length in an arc shape in the opening-closing direction of the front cover 2, and the first fulcrum shaft 10-1 is engaged with the elongate hole 11-21 and swingably supported. The end arc 11-21a of the elongate hole 11-21 on the side of the front cover 2 is slidably fitted to the outer periphery of the first fulcrum shaft 10-1 in the circular section to form the first fulcrum S1 of the link 11. The fitting surface is supported by the urging force of the tension spring 12 as the urging member. An edge 11-22 that surrounds the elongate hole 11-21 is formed integrally with the link 11.

The tension spring 12 is attached between a spring hook 11-4 formed at the link 11 and a spring hook 10-4 formed at the holder 10 and exerts urging force on the first fulcrum shaft 10-1 in an anti-clockwise direction as viewed in FIG. 3A.

The holder 10 is provided with a rotation stop rib 10-2, and a stopper 11-5 formed at the link 11 abuts against the rotation stop rib 10-2, so that the home position for the link 11 is defined when the front cover 2 is opened.

A holding portion 10-5 provided at the holder 10 includes a concave groove 10-51 with which the second fulcrum shaft 11-3 is engaged, and the concave groove 10-51 is open toward the front cover 2.

The operation shaft 11-6 and the second fulcrum shaft 11-3 protrude coaxially in opposite directions to each other from the left and right side surfaces of the link 11 and provided in parallel to the first fulcrum shaft 10-1.

The second fulcrum shaft 11-3 is supported at the concave groove 10-51 of the holding portion 10-5 as the second support portion provided at the holder 10 in the position in which the switch 13 is pressed by the operation shaft 11-6. The second fulcrum shaft is fitted to the concave groove 10-51 to form the second fulcrum S2. The furthermost end of the concave groove 10-51 on the side of the apparatus main body has an arc shape having the same diameter as that of the second fulcrum shaft 11-3.

The operation shaft 11-6 protrudes through a holding hole 10-6 as a regulating elongate hole provided at the partition 10-9 of the holder 10 to the side of the switch 13 at the back surface and can abut against the switch lever 13-1 of the switch 13.

As shown in FIG. 3B, the switch 13 is positioned and fixed by two positioning bosses 10-8 and a snap-fit 10-7 on the holder 10. Here, the two positioning bosses 10-8 and the snap-fit 10-7 form a positioning portion. The holding hole 10-6 is formed to oppose the holding portion 10-5 and engaged with the operation shaft 11-6 formed on the link 11 to support together from the front and back sides of the link 11 and form the second fulcrum S2.

The switch 13 is a micro-switch, and a plunger (not shown) is pushed into the switch 13 by pushing the switch lever 13-1 by the operation shaft 11-6. As the plunger is pushed in, an internal movable contact abuts against a normally-closed fixed contact, so that a common terminal 13-4 and a normally-open terminal 13-5 conduct and the state is switched from off to on.

Figure 4A:
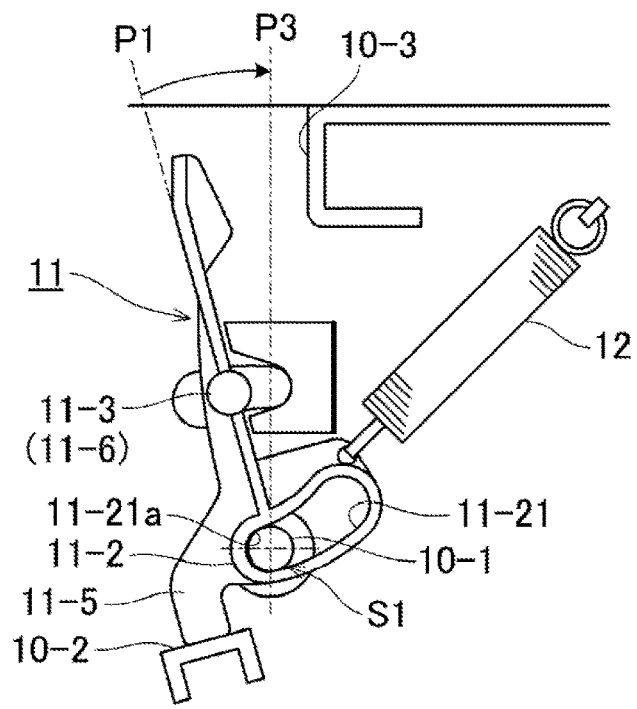
FIGS. 4A and 4B are enlarged views for illustrating a link in the device in FIGS. 3A and 3B.
Figure 4B:
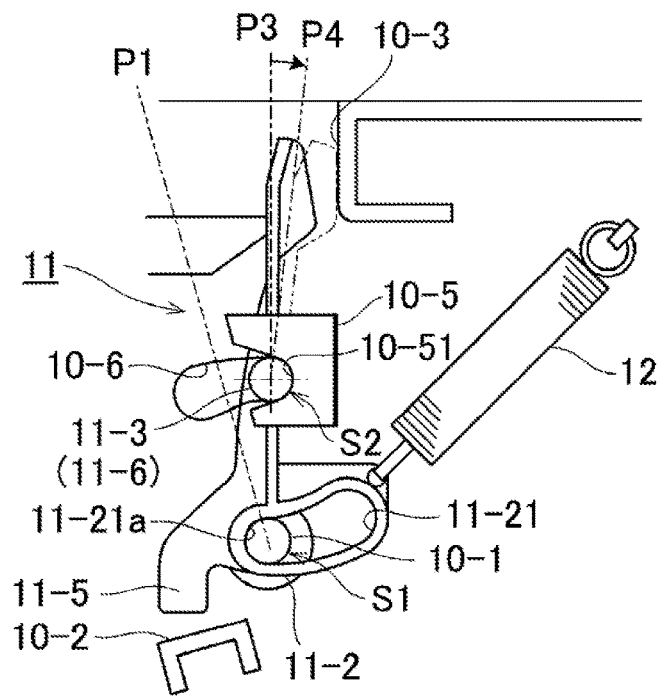

FIGS. 4A and 4B show the operation state of the link 11.

More specifically, the link 11 rotates around the first fulcrum 51 according to closing operation of the front cover 2 from the home position P1 to an operation position P3 in which the operation shaft 11-6 pushes the switch 13 to turn on the switch (FIG. 4A).

When the operation shaft 11-6 pushes the switch 13, the second fulcrum shaft 11-3 is in abutment against the concave groove 10-51 of the holding portion 10-5 and the rotation fulcrum of the link 11 is switched from the first fulcrum S1 to the second fulcrum S2 after the operation position P3 (FIG. 4B). Overstroke of the front cover 2 in the closing direction is absorbed by separating the end arc 11-21a of the elongate hole 11-21 of the first fulcrum forming portion 11-2 from the first fulcrum shaft 10-1 to the side of the front cover 2 against the urging force of the tension spring 12.

Note that when the front cover 2 is opened, the link 11 again rotates anti-clockwise to let the stopper 11-5 abut against the rotation stop rib 10-2, so that the home position is regained.

Figure 5:
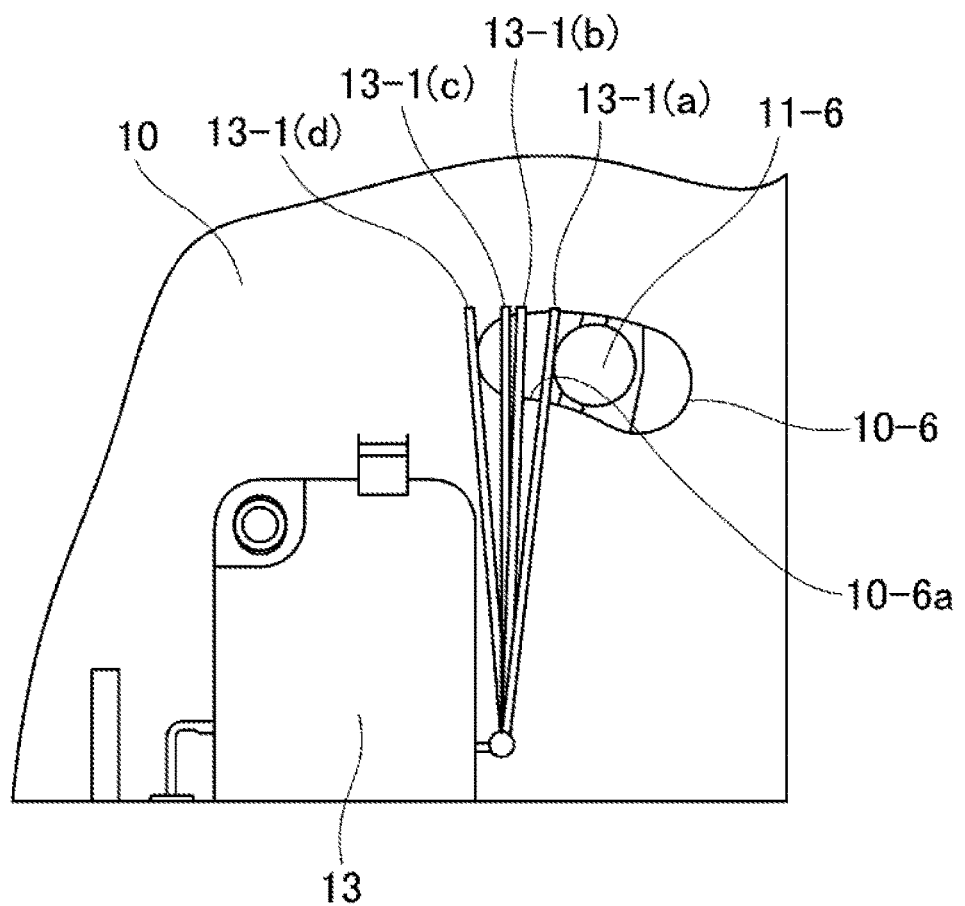
FIG. 5 is a view for illustrating an operation position for a switch lever in the device in FIGS. 3A and 3B.

Now, with reference to FIG. 5, the operation of the switch lever 13-1 will be described.

In FIG. 5, 13-1(a) to 13-1(d) designate operation states of the switch lever 13-1. The switch 13 is in an off-position in (a) and in a switching position from off to on in (b), and the switch 13 is on and in a limit position for pivotal movement in (d). The position (c) is set to a substantially intermediate position between the switching position (b) and the limit position for pivotal movement (d) and in a position in contact with the arc of the concave groove 10-51 on the holding portion 10-5 of the holder 10. Therefore, when the link 11 moves to abut against the concave groove 10-51 of the holding portion 10-5, the switch lever 13-1 moves to the position (c) and the switch 13 is turned on.

FIGS. 6A to 6E are sectional views for illustrating the operation of the opening-closing member detecting device.

Now, the opened state of the front cover 2 will be described, followed by a description of the closed state.

Figure 6A:
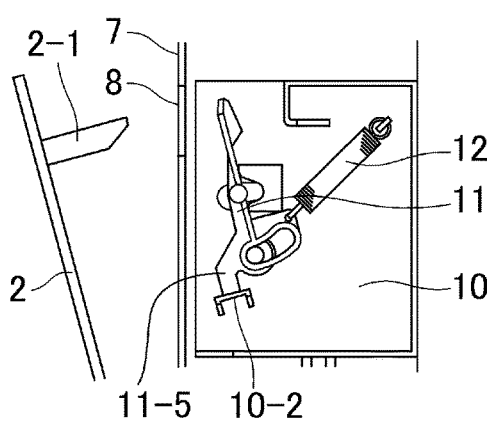
FIGS. 6A to 6E are views for illustrating the operation of the device in FIGS. 3A and 3B.

FIG. 6A shows the front cover 2 in an opened state (home position). At the time, the link 11 is stopped in a position in which the stopper 11-5 abuts against the rotation stop rib 10-2.

Figure 6B:
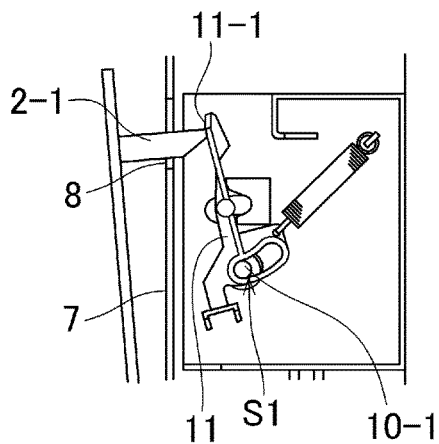

In FIG. 6B, the striking portion 2-1 of the front cover 2 passes through the slit 8 and enters the inside cover 7 to contact the pressing portion 11-1 of the link 11. Then, the link 11 carries out pivotal movement around the first fulcrum S1.

Figure 6C:
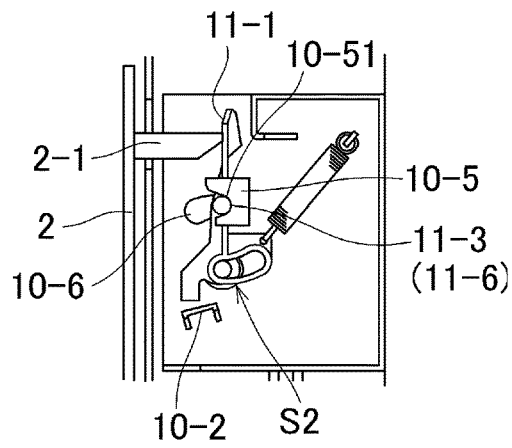

In FIG. 6C, the striking portion 2-1 further advances by closing operation of the front cover 2, the pressing portion 11-1 is further pushed in, and the second fulcrum shaft 11-3 is in abutment against the concave groove 10-51 of the holding portion 10-5. Almost simultaneously with the abutment of the second fulcrum shaft 11-3 against the holding portion 10-5, the operation shaft 11-6 abuts against the end 10-6a of the holding hole 10-6 on the apparatus main body side to form the second fulcrum S2. Then, the switch 13 is turned on. As illustrated in the figure, the second fulcrum shaft 11-3 and the operation shaft 11-6 have the same shaft diameter. The concave groove 10-51 of the holding portion 10-5 and the end 10-6a of the holding hole 10-6 on the apparatus main body side has the same radius.

Figure 6D:
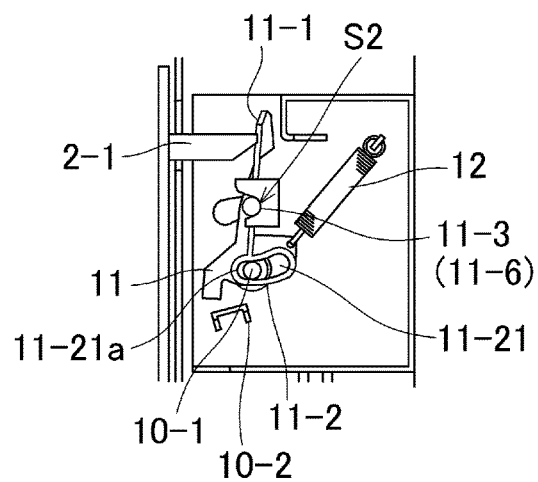

As shown in FIG. 6D, when the pressing portion 11-1 is pushed in, the link 11 starts pivotal movement around the second fulcrum S2 formed by the second fulcrum shaft 11-3 and the operation shaft 11-6. The link pivots in abutment against the switch 13. Therefore, if the advanced amount of the striking portion 2-1 changes, the abutment portion of the operation shaft 11-6 against the switch 13 has an arc shaped section around the second fulcrum S2, and the pushed amount of the switch 13 is constant. During the process, the end arc 11-21a of the elongate hole 11-21 of the link 11 is separated from the first fulcrum shaft 10-1, and the first fulcrum shaft 10-1 swings in the elongate hole 11-21.

Figure 6E:
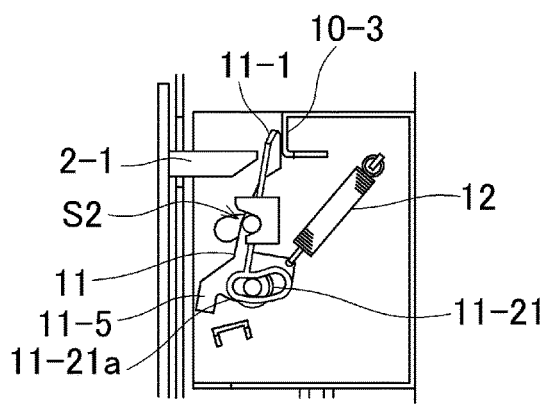

As shown in FIG. 6E, when the pressing portion 11-1 is pushed further beyond the state in FIG. 6D by some external force, the pressing portion 11-1 is regulated from rotating by a movement limiting stopper 10-3.

Note that according to the embodiment, the tension spring 12 is used as a method of urging the link 11, a compression spring or a torsion coil spring may be used.

According to the embodiment, the elongate hole 11-21 is provided on the side of the first fulcrum forming portion 11-2 of the link 11, and the first fulcrum shaft 10-1 is provided at the holder 10, while, conversely, the first fulcrum forming portion on the side of the link 11 may be formed as a shaft, and an elongate hole may be provided on the side of the holder.

As in the foregoing, according to the invention, the operation shaft 11-6 that pushes the switch 13 and the second fulcrum S2 for absorbing overstroke are set in the same position, so that the pushed amount of the switch 13 is kept constant, and the reliability of the device can be improved. Furthermore, variations in the link 11 and the front cover may be absorbed in the elongate hole 11-21 provided at the first fulcrum forming portion, which improves the degree of freedom in designing.

Since the operation shaft 11-6 does not advance beyond the holding portion 10-5, force applied on the switch 13 is constant regardless of the operation speed or operation force of the front cover 2, which can prevent the switch 13 from being damaged.

The positioning portion for the holder 10 that holds the switch 13 and one point in the holding portion 10-5 that holds the link 11 need only be managed to surely keep the pushed amount constant, so that the management cost for the parts can be reduced.

Second Embodiment

Now, a second embodiment of the present invention will be described with reference to FIGS. 7A and 7B.

Only the elements different from the first embodiment will mainly be described in the following, the same components are designated by the same reference numerals, and their description will not be repeated.

Figure 7A:
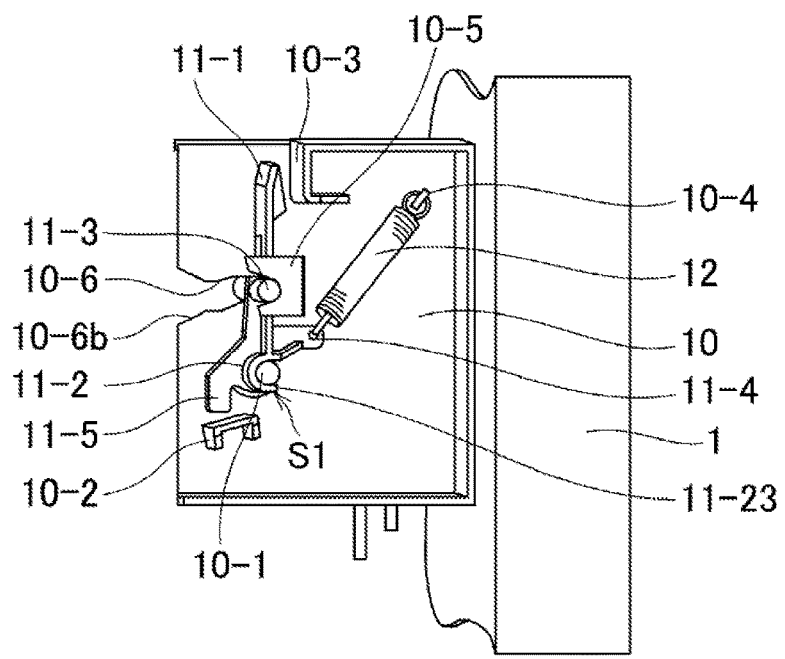
FIGS. 7A and 7B are perspective views of an opening-closing member detecting device according to a second embodiment of the present invention.
Figure 7B:
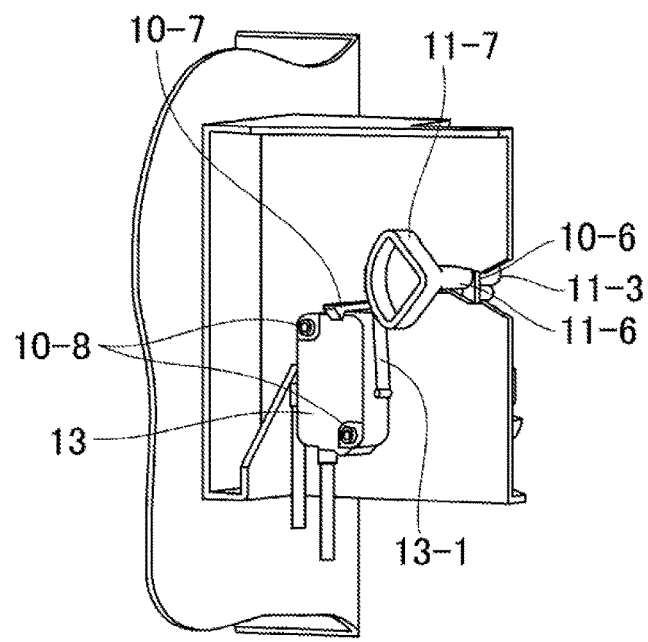

FIG. 7A is a perspective view of an opening-closing member detecting device, and FIG. 7B is a perspective view of the opening-closing member detecting device on the back surface side.

As shown in FIG. 7A, according to the embodiment, a U-shaped groove 11-23 that is open on the side of the apparatus main body 1, in other words, on the opposite side to the front cover is provided in place of the elongate hole 11-21 provided at the first fulcrum forming portion 11-2 of the link 11. The first fulcrum shaft 10-1 provided at the holder 10 is engaged with the U-shaped groove 11-23 to form the first fulcrum S1. The U-shaped groove 11-23 can be separated to the side of the front cover 2 with respect to the first fulcrum shaft 10-1.

In this way, the first fulcrum forming portion 11-2 that forms the first fulcrum S1 is provided with the U-shaped groove 11-23 in place of the elongate hole 11-21 according to the first embodiment, a greater overshoot can be absorbed. Therefore, the second embodiment can suitably be applied to a large opening-closing member prone to variations in parts.

Now, the back surface side in FIG. 7B will be described.

According to the second embodiment, a hammer portion 11-7 including an arc shape having a greater diameter than the operation shaft 11-6 is provided at the end of the operation shaft 11-6 as an abutment portion in abutment against the switch lever 13-1 of the switch 13. A central axis line through a virtual cylinder including the arc shape of the hammer portion 11-7 is formed coaxially (around the second fulcrum S2) with the second fulcrum shaft 11-3 and the operation shaft 11-6. Note that the end 10-6b of the holding hole 10-6 on the side of the front cover 2 is opened.

The hammer portion 21-7 abuts against the switch lever 13-1 to cut off/connect the switch. The switch 13 can be provided freely by freely setting the outer diameter of the hammer portion 21-7.

Third Embodiment

Now, a third embodiment of the present invention will be described with reference to FIG. 8 to FIGS. 13A and 13B.

In the following, only the elements different from the first embodiment will mainly be described, the same components are designated by the same reference characters, and their description will not be repeated.

Figure 8:
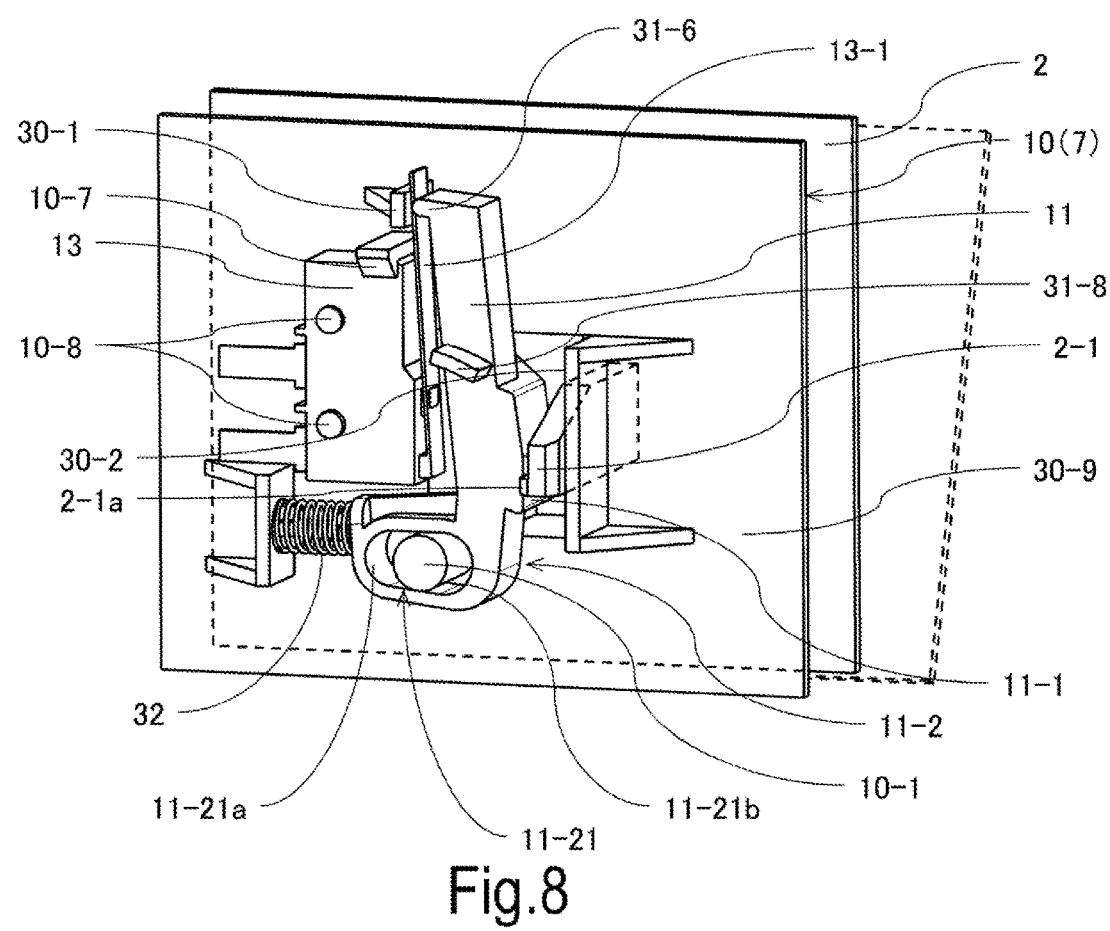
FIG. 8 is a perspective view of an opening-closing member detecting device according to a third embodiment of the present invention.

With reference to FIG. 8, a general configuration of the opening-closing member detecting device will be described, and with reference to FIGS. 9A and 9B, and FIGS. 10A and 10B, a detailed configuration of the link 11 and the holder 10 will be described.

FIG. 8 is a perspective view of an opening-closing member detecting device according to the third embodiment as viewed from the back surface side of the apparatus main body 1 when the front cover 2 is closed.

Figure 9A:
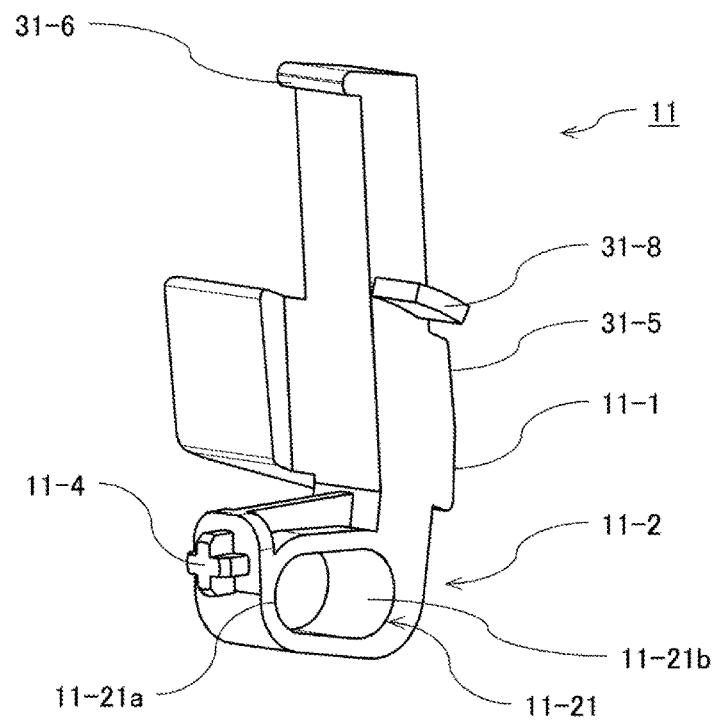
FIGS. 9A and 9B are enlarged views for illustrating a link in the device in FIG. 8.
Figure 9B:
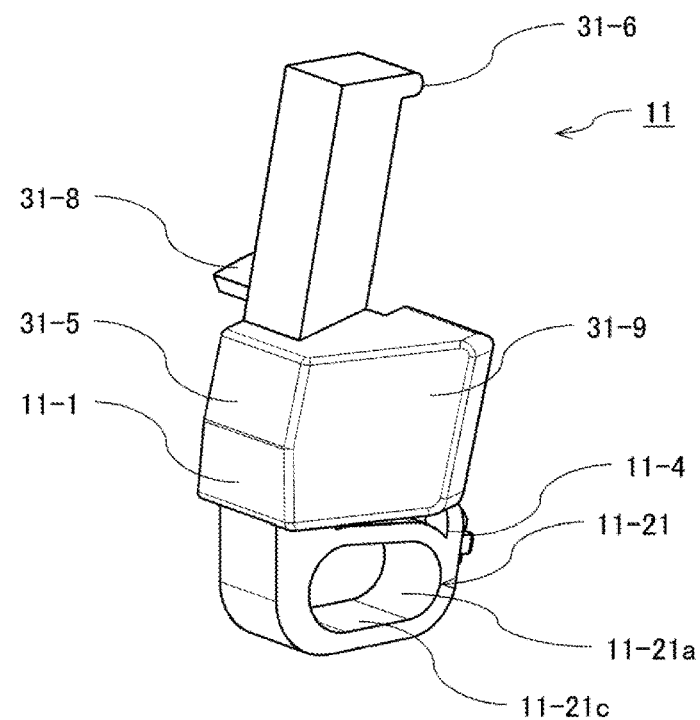

FIG. 9A is a perspective view of the link 11 according to the third embodiment provided in the apparatus main body 1 as viewed from the right back surface, FIG. 9B is a perspective view as viewed from the left front surface. Here, the left and the right refer to the sides when the apparatus main body 1 is viewed from the side on which the front cover 2 is provided in FIGS. 1A and 1B.

Figure 10A:
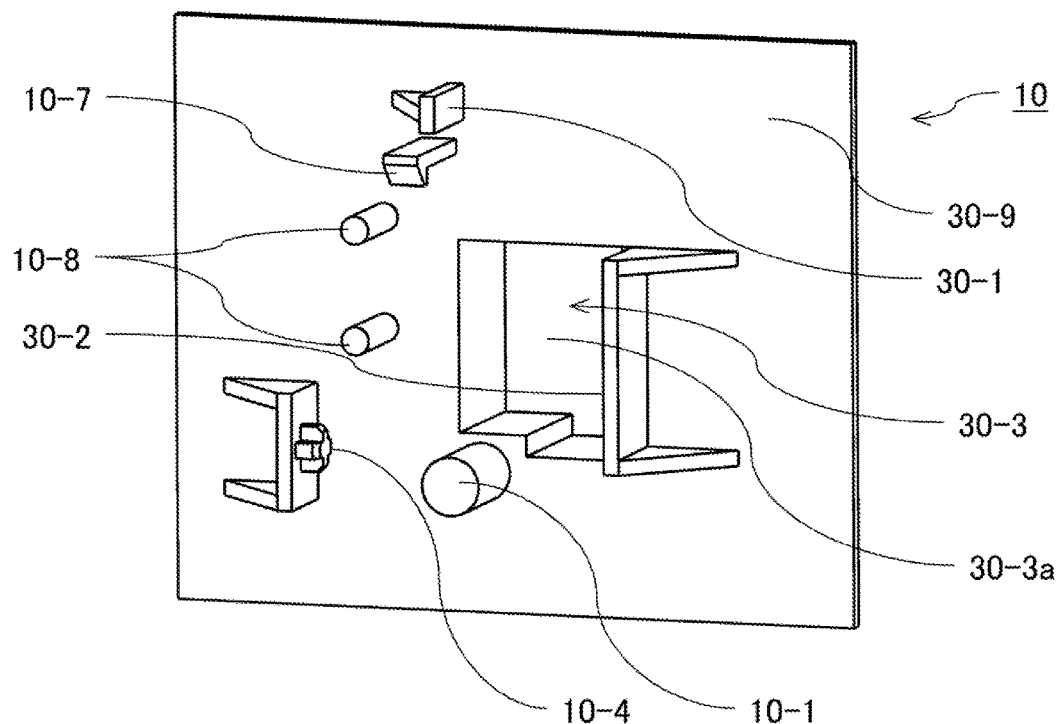
FIGS. 10A and 10B are enlarged views for illustrating a holder in the device in FIG. 8.
Figure 10B:
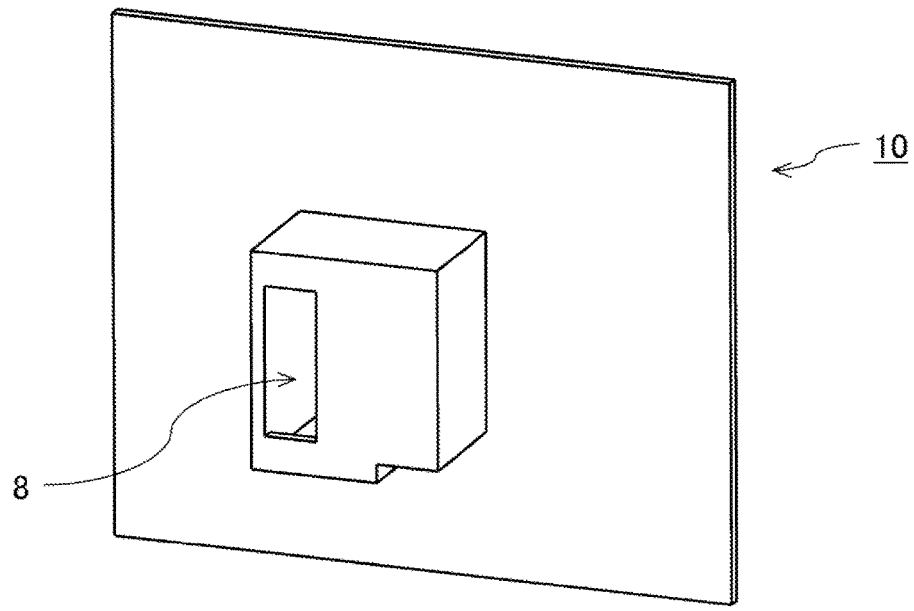

FIG. 10A is a perspective view of the holder 10 as a frame according to the third embodiment when viewed from the back side of the apparatus main body 1, and FIG. 10B is a perspective view from the front side.

While according to the first and second embodiments, the opening-closing direction of the front cover 2 and the swinging direction of the link 11 are the same, according to this embodiment, the link 11 is configured to swing in the direction orthogonal to the opening-closing direction of the front cover 2.

The link 11 is a resin part in a substantially L-shape that extends in the up-down direction and has a thickness slightly greater than the width of the switch lever 13-1 of the switch 13.

The link 11 has a first fulcrum forming portion 11-2, a switch operation portion 31-6, a pressing portion 11-1 as a power-point portion, an abutting rib 31-8, an inclined portion 31-9, a home position positioning portion 31-5, and a spring seat 11-4. Here, the switch operation portion 31-6 corresponds to the second fulcrum forming portion.

The first fulcrum forming portion 11-2 has an elongate hole 11-21 that is formed at the shorter side of the L-shape to extend in the shorter-side direction (the left-right direction of the apparatus main body 1) for a prescribed length and has arc-shaped ends. The end arc 11-21b on the right (see FIG. 9A) has an inner diameter greater than the inner diameter of the left end arc 11-21a. The contour between the arc shapes on both ends is defined by a plane 11-21c connected by a tangent to the arcs on both ends.

The spring seat 11-4 is formed at the tip end of the shorter side of the L-shape of the link 11 and has a cross boss shape that extends for a prescribed length to the left (see FIG. 9A) and has an outer size in such a relation with the inner diameter of a compression spring 32 (that will be described) that the spring seat 11-4 can be inserted by light press-fitting. The spring seat 11-4 is positioned a prescribed distance above (on the side of pressing portion 11-1) the first fulcrum forming portion 11-2.

The switch operation portion 31-6 is a rib that protrudes to the left (see FIG. 9A) at the tip end of the longer side of the L-shape.

The pressing portion 11-1 is a plane positioned between the first fulcrum forming portion 11-2 and the switch operation portion 31-6 and facing to the right (see FIG. 9A).

The home position positioning portion 31-5 is a plane adjacent to the upper side of the pressing portion 11-1 and has its upper side inclined to the left (see FIG. 9A) with respect to the pressing portion 11-1.

The inclined portion 31-9 is formed as a plane adjacent to the pressing portion 11-1 and the home position positioning portion 31-5 and extends to the right in the forward direction from sides of the pressing portion 11-1 and the position positioning portion 31-5 as the origin (see FIG. 9B).

The abutment rib 31-8 is a rib that has an arc-shaped section and extends to the back surface side of the apparatus main body 1 from the vicinity of the center of the longer side of the L-shape.

The holder 10 is configured as shown in FIGS. 10A and 10B. The holder 10 has a partition 30-9, a first fulcrum shaft 10-1, a switch regulating portion 30-1, two positioning bosses 10-8, a snap-fit 10-7, a spring seat 10-4, an inclined portion receiving portion 30-3, a home position positioning wall 30-2, and a slit 8. Here, the first fulcrum shaft 10-1 corresponds to the first support portion, and the switch regulating portion 30-1 corresponds to the second support portion and the regulating portion. The two positioning bosses 10-8 and the snap-fit 10-7 form the positioning portion.

As shown in FIG. 8, the partition 30-9 is in a plate shape parallel to the front cover 2 when the front cover 2 is closed, a surface thereof (front surface) on the side of the front cover 2 serves as the inside cover 7 and a surface thereof (back surface) on the wall side of the apparatus main body 1 is shaped to be attached with the switch 13 and the link 11.

The first fulcrum shaft 10-1 is a boss having a circular section that extends perpendicularly from the back surface of the partition 30-9 to be fitted with the end arc 11-21a on the left side (see FIG. 8) of the elongate hole 11-21 of the link 11 and has an outer diameter that allows the shaft to slide therein.

The two positioning bosses 10-8 and the snap-fit 10-7 support the switch 13 so that the operation direction of the switch lever 13-1 is parallel to the partition 30-9 of the front cover 2. At the time, the two positioning bosses 10-8 and the snap-fit 10-7 support the switch 13 so that the tip end of the switch lever 13-1 faces upward and the switch lever 13-1 is on the right side (see FIG. 8).

The switch regulating portion 30-1 is a wall that is positioned above the two positioning bosses 10-8 and the snap-fit 10-7 as a switch holding structure and faces to the right side (see FIG. 10A).

The spring seat 10-4 is positioned on the upper left of the first fulcrum shaft 10-1 (see FIG. 10A) to extend to the right and formed by a cross boss shape having an outer diameter smaller than the inner diameter of the compression spring 32.

The inclined portion receiving portion 30-3 has a box shape recessed from the back surface of the partition 30-9 to the front side of the apparatus main body 1 and stores the inclined portion 31-9 of the link 11 when the link 11 is attached.

The home position positioning wall 30-2 is formed by the right side surface (see FIG. 10A) of the inclined portion receiving portion 30-3 and a wall that extends from the partition 30-9 to the back surface side of the apparatus main body 1 on the same surface as the right side surface.

The slit 8 is a rectangular hole provided at a surface 30-3a parallel to the partition 30-9 of the inclined portion receiving portion 30-3 to extend in the up-down direction and has a size that allows the striking portion 2-1 of the front cover 2 to be inserted therethrough.

The holder 10 is attached a prescribed gap at the wall surface (not shown) of the apparatus main body 1 provided in parallel to the partition 30-9.

As shown in FIG. 8, the link 11 is swingably supported as the longer side is positioned on the right of the switch 13, the shorter side is provided under the switch, and the elongate hole 11-21 of the first fulcrum forming portion 11-2 is engaged with the first fulcrum shaft 10-1 of the holder 10.

When the front cover 2 is in a closed state, the switch operation portion 31-6 of the link 11 presses the vicinity of the tip end of the switch lever 13-1 of the switch 13 and abuts against the switch regulating portion 30-1 of the holder 10 through the switch lever 13-1. The switch lever 13-1 of the switch 13 is provided to stop in an intermediate position between the switching position between off and on states and the limit position at the time.

The striking portion 2-1 is a protrusion that protrudes perpendicularly from the back surface of the front cover 2 and has a rectangular section elongated in the up-down direction and is provided on the right side (see FIG. 8) of the pressing portion 11-1 of the link 11 when the front cover 2 is in a closed state.

The striking portion 2-1 has a pressing rib 2-1a that extends in the front-back direction of the apparatus main body 1 at the lower end of the left surface (see FIG. 8). When the front cover 2 is in a closed state, the pressing rib 2-1a abuts against the pressing portion 11-1 of the link 11 to press the switch lever 13-1 of the switch 13 through the link 11.

The compression spring 32 is attached between the spring seat 11-4 of the link 11 and the spring seat 10-4 of the holder 10 and exerts urging force in the direction in which the end arc 11-21a on the left side (see FIG. 8) of the elongate hole 11-21 of the link 11 abuts against the first fulcrum 10-1 of the holder 10.

According to the first and second embodiments, the tip end of the striking portion 2-1 provided at the front cover 2 abuts against the pressing portion 11-1 of the link 11 to position the link 11. Meanwhile, as described above, according to this embodiment, the rib 2-1a provided at the side surface of the striking portion 2-1 abuts against the pressing portion 11-1 of the link 11 to position the link 11.

Now, with reference to FIGS. 11A and 11B to FIGS. 13A and 13B, the relation among the link 11, the striking portion 2-1, and the switch lever 13-1 in operation will be described.

Figure 11A:
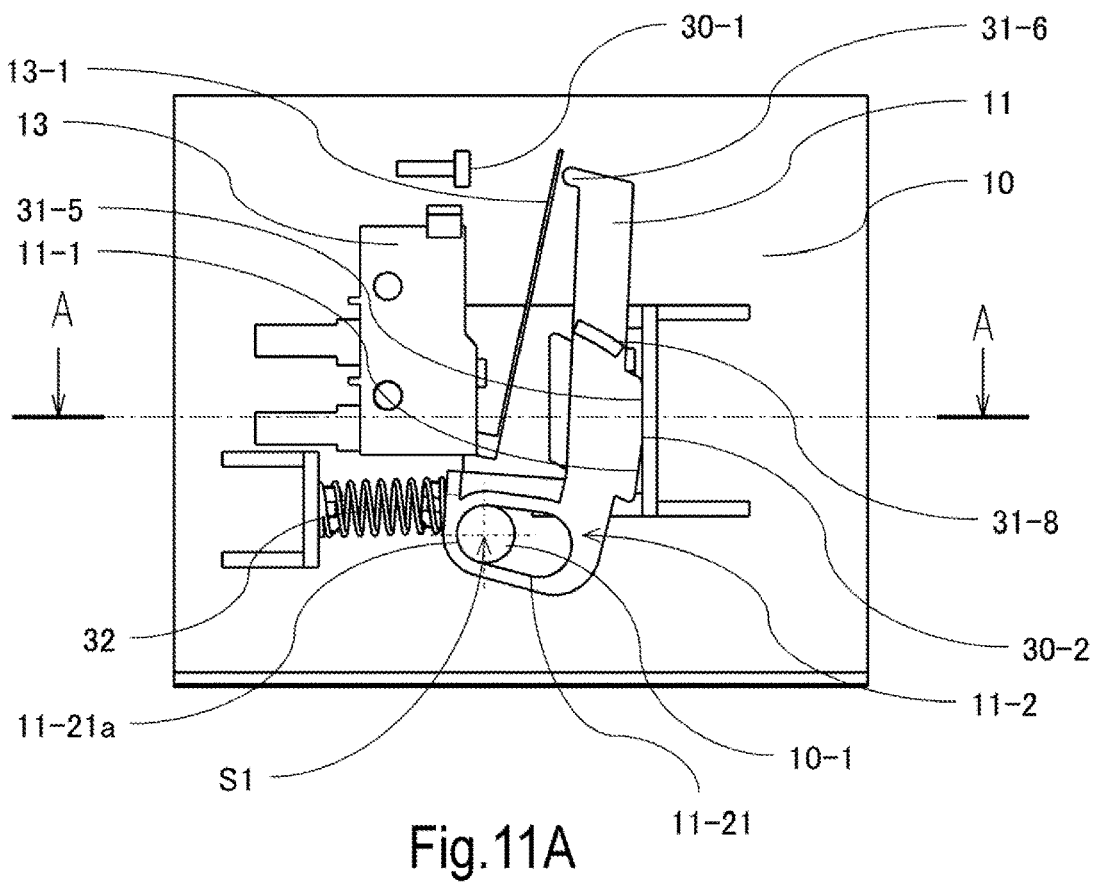
FIGS. 11A and 11B are views for illustrating a home position in the device in FIG. 8.
Figure 11B:
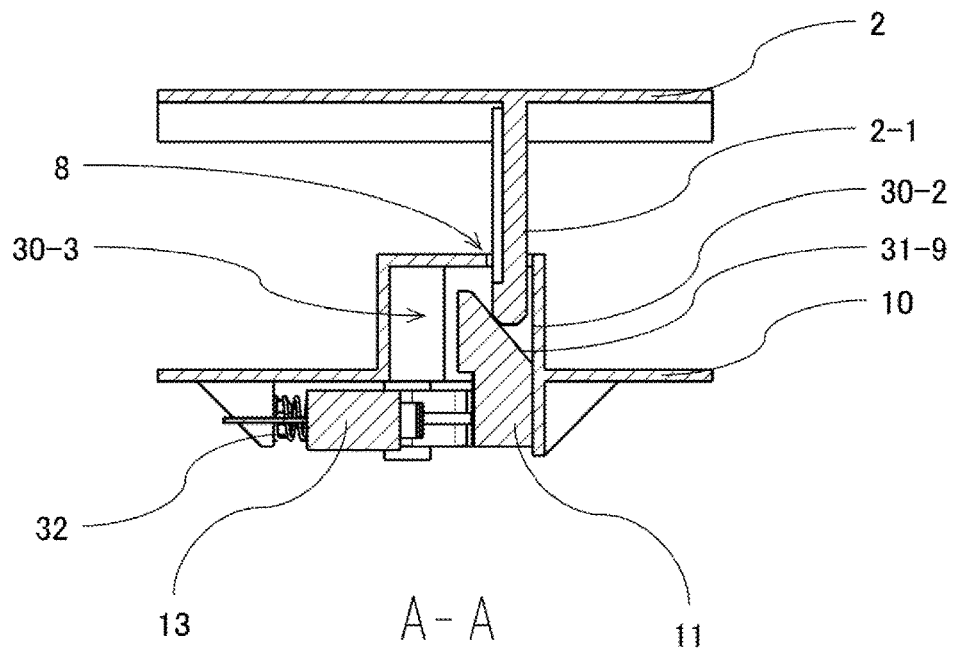

FIG. 11A is a rear view of the opening-closing member detecting device in which the link 11 is in the home position, and the striking portion 2-1 of the front cover 2 is just about to abut against the inclined portion 31-9 of the link 11 after passing through the slit 8. FIG. 11B is a top sectional view taken along A-A in FIG. 11A.

The first fulcrum forming portion 11-2 forms the first fulcrum S1 as the first fulcrum shaft 10-1 of the holder 10 and the end arc 11-21a on the left side (see FIG. 11A) of the elongate hole 11-21 of the link 11 abut against each other by the function of the compression spring 32.

The link 11 receives a moment acting clockwise (see FIG. 11A) by the compression spring 32 since the spring seat 11-4 is positioned above the first fulcrum S1. The link 11 is supported at the holder 10 as a moment acting clockwise by the compression spring 32 and the weight of the link 11 itself causes the home position positioning portion 31-5 of the link 11 to abut against the home position positioning wall 30-2 of the holder 10.

At the time, the switch lever 13-1 of the switch 13 is separated from the switch regulating portion 30-1 of the holder 10, and the switch 13 attains an off position.

The switch operation portion 31-6 of the link 11 is separated from the switch lever 13-1.

As the striking portion 2-1 further advances from the state in FIG. 11A, the tip end of the striking portion 2-1 abuts against the inclined portion 31-9 of the link 11, so that the link 11 receives an anti-clockwise moment (see FIG. 11A). The moment resists against the clockwise moment by the compression spring 32 and the weight of the link, so that the link starts to swing anti-clockwise (see FIGS. 11A and 11B) around the first fulcrum S1. At the time, the link 11 swings as the abutment rib 31-8 of the link 11 slides against the wall surface (not shown) of the apparatus main body 1. Thereafter, the switch operation portion 31-6 of the link 11 starts to abut against the switch lever 13-1.

Figure 12A:
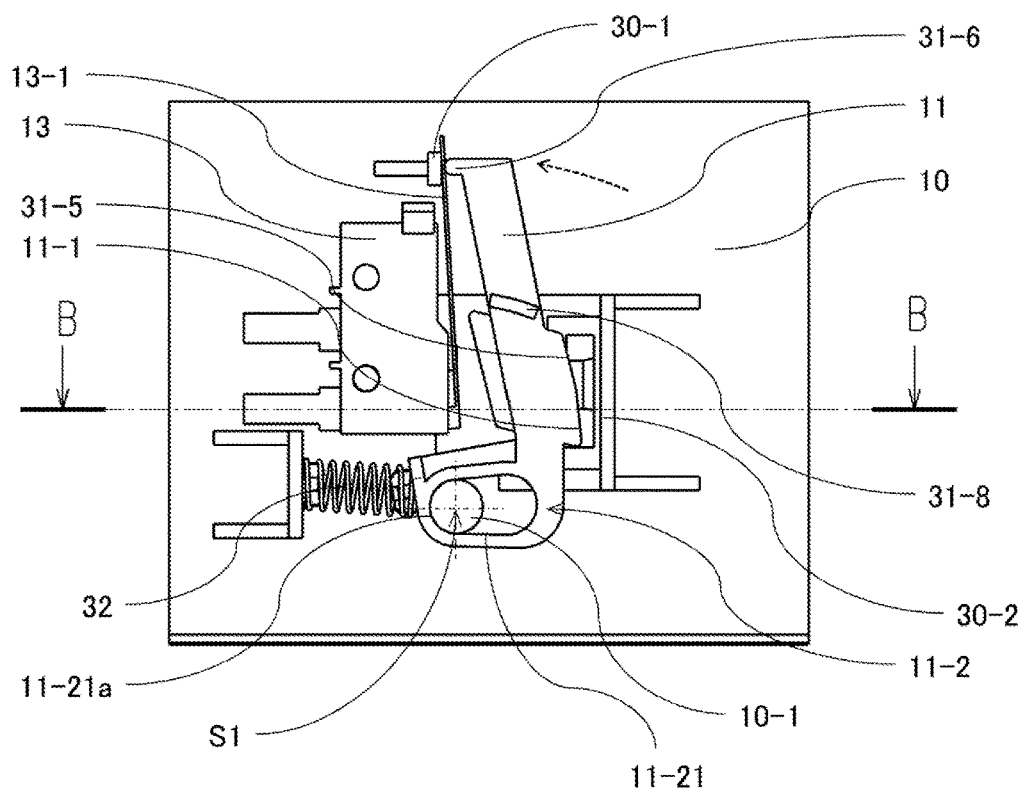
FIGS. 12A and 12B are views for illustrating an operation position for the device in FIG. 8.
Figure 12B:
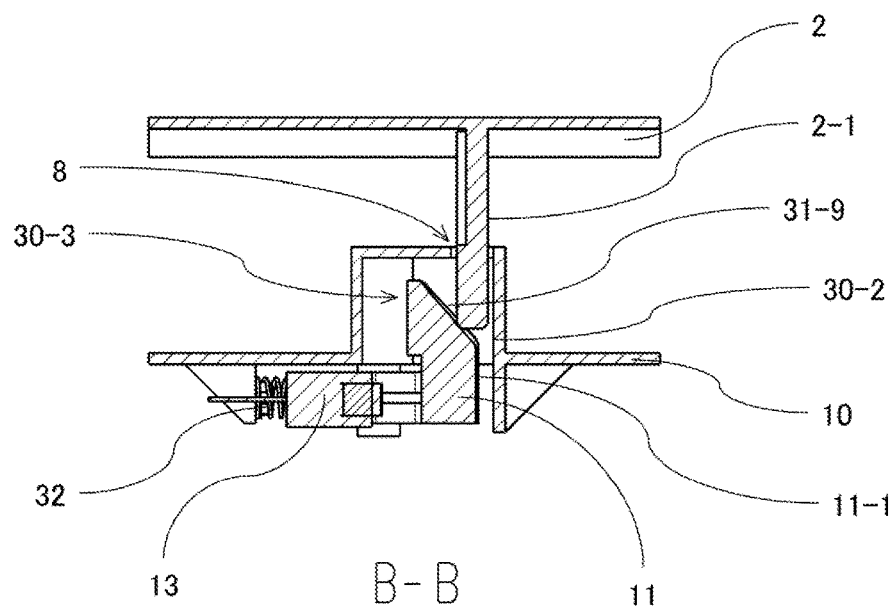

FIG. 12A is a rear view of the opening-closing member detecting device when the link 11 swings until the switch lever 13-1 abuts against the switch regulating portion 30-1, and FIG. 12B is a top sectional view taken along B-B in FIG. 12A.

At the time, the striking portion 2-1 of the front cover 2 and the inclined portion 31-9 of the link 11 continue to be engaged with each other (see FIG. 12B). The switch lever 13-1 passes the switching position from off to on before abutting against the switch regulating portion 30-1 and is supported in the intermediate point between the limit position and the switching position while in abutment against the switch regulating portion 30-1 as described above. The link 11 keeps the first fulcrum shaft 10-1 and the end arc 11-21a on the left side (see FIG. 12A) of the elongate hole 11-21 in abutment against each other by the function of the compression spring 32 until the switch lever 13-1 abuts against the switch regulating portion 30-1. In this way, while the first fulcrum shaft 10-1 and the end arc 11-21a on the left side of the elongate hole 11-21 are kept in abutment against each other, the link 11 swings anti-clockwise around the first fulcrum S1 (along the broken line arrow in FIG. 12A).

Figure 13A:
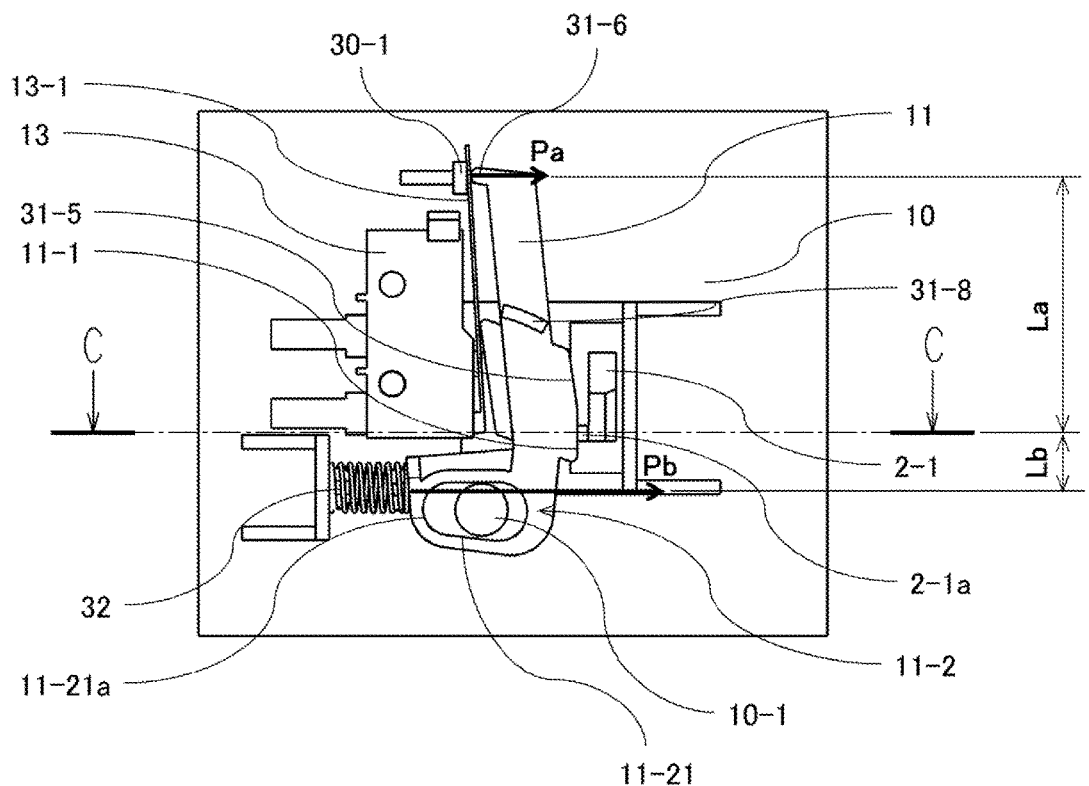
FIGS. 13A and 13B are views for illustrating a complete closing operation position for the device in FIG. 8.
Figure 13B:
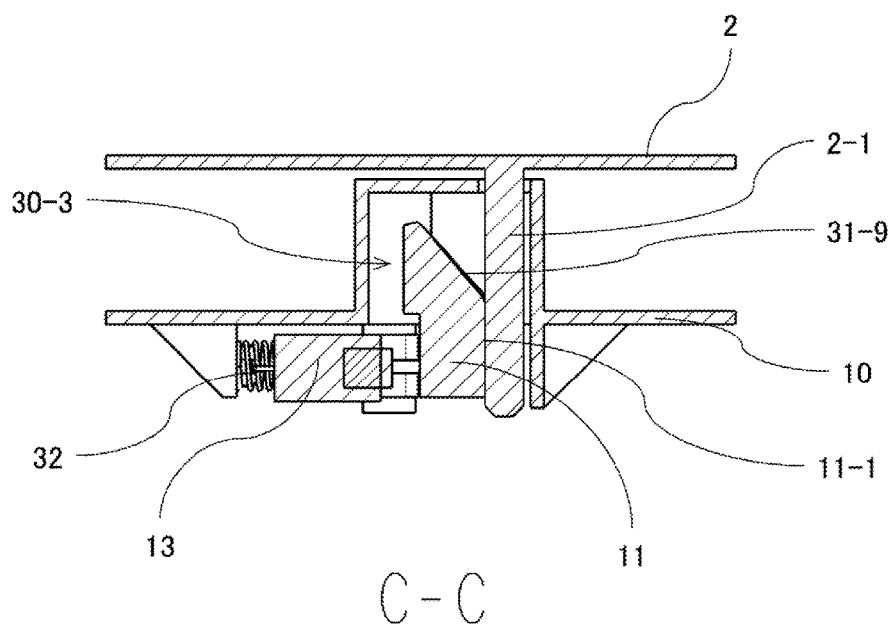

FIG. 13A is a rear view of the opening-closing member detecting device when the striking portion 2-1 is pushed in until the front cover 2 attains a fully closed state, and FIG. 13B is a top sectional view taken along line C-C in FIG. 13A.

When the striking portion 2-1 is pushed in, the link swings until the switch lever 13-1 abuts against the switch regulating portion 30-1. Thereafter, the end arc 11-21a on the left side (see FIG. 13A) of the elongate hole 11-21 is separated from the first fulcrum shaft 10-1 against the reaction force of the compression spring 32, and the link 11 swings clockwise (see FIG. 13A) around the tip end of the switch operation portion 31-6. At the time, in the elongate hole 11-21 of the link 11, since the inner diameter of the end arc 11-21b on the right is greater than the inner diameter of the end arc 11-21a on the left (see FIG. 13A), the link can smoothly swing. The swinging continues until the tip end of the striking portion 2-1 of the front cover 2 reaches the pressing portion 11-1 beyond the inclined portion 31-9 of the link 11 (see FIG. 13B). Here, the switch operation portion 31-6 as the second fulcrum forming portion is supported at the switch regulating portion as the second support portion through the switch lever 13-1, so that the second fulcrum S2 is formed. After the tip end of the striking portion 2-1 of the front cover 2 reaches the pressing portion 11-1 of the link 11, the striking portion 2-1 moves as the pressing rib 2-1a and the pressing portion 11-1 slide until the front cover 2 attains a fully closed state.

Here, when the front cover 2 is in a fully closed state, the spring pressure of the compression spring 32 is set so that the following relational expression is established. Here, the force applied to the link 11 from the switch lever 13-1 (on the side of the switch regulating portion) through the switch operation portion 31-6 is Pa, and the distance from the contact point between the pressing portion 11-1 of the link 11 and the pressing rib 2-1a of the striking portion 2-1 to Pa is La. The force applied to the link 11 from the compression spring 32 through the spring seat 11-4 is Pb, and the distance from the contact point between the pressing portion 11-1 of the link 11 and the pressing rib 2-1a of the striking portion 2-1 to Pb is Lb.

$$Pa \times La < Pb \times Lb$$

When the relational expression is established, the switch lever 13-1 of the switch 13 is not separated from the switch regulating portion 30-1 of the holder 10 and can be kept in an on state.

Note that according to the embodiment, the first fulcrum shaft 10-1 is kept in abutment against the end arc 11-21a on the left side (see FIG. 12A) of the elongate hole 11-21 until the switch operation portion 31-6 abuts against the switch regulating portion 30-1 through the switch lever 13-1. As the first fulcrum shaft 10-1 is kept in abutment against the end arc 11-21a of the elongate hole 11-21, the link 11 swings around the first fulcrum S1, but the spring pressure of the compression spring 32 does not have to satisfy the condition for this operation. More specifically, while the first fulcrum shaft 10-1 abuts against the end arc 11-21a on the left side of the elongate hole 11-21 (as shown in FIGS. 12A and 12B), the above relational expression needs not be established. The relational expression needs only be established when the front cover 2 is in a fully closed state, overstroke of the striking portion 2-1 is absorbed, and the compression spring 32 is compressed (as shown FIGS. 13A and 13B).

According to the embodiment, the compression spring 32 is used for urging the link 11 but a tension spring or a torsion coil spring may be used.

According to the embodiment, the elongate hole 11-21 is provided on the side of the first fulcrum forming portion 11-2 of the link 11 and the first fulcrum shaft 10-1 is provided at the holder 10, while, conversely, the first fulcrum forming portion on the side of the link 11 may be formed as a shaft and an elongate hole may be formed on the holder side.

According to the embodiment, the link 11 swings in the direction orthogonal to the opening-closing direction of the front cover 2 but the link may swing in the same direction, so that the pressing portion 11-1 of the link 11 may be pressed directly by the tip end of the striking portion 2-1 of the front cover 2.

In place of the elongate hole 11-21 provided on the side of the first fulcrum forming portion 11-2 of the link 11 according to the second embodiment, there may be a U-shaped groove having an open end on the side that does not form the first fulcrum, in other words, on the opposite side to the switch.

According to the embodiment, the switch regulating portion 30-1 of the holder 10 regulates the position of the switch operation portion 31-6 of the link 11 through the switch lever 13-1, but the position of the switch operation portion 31-6 of the link 11 may be regulated directly rather than through the switch lever 13-1.

As in the foregoing, according to the present invention, the pressing portion (power-point portion) 11-1 is provided between the switch operation portion 31-6 and the first fulcrum forming portion 11-2. In this way, the swinging stroke of the pressing portion (power-point portion) 11-1 can be smaller than the case in which the switch operation portion 31-6 is provided between the pressing portion (power-point portion) 11-1 and the first fulcrum forming portion 11-2, and therefore more space can be saved, which improves the degree of freedom in designing.

The position to which the switch lever 13-1 is pushed is defined by abutment against the switch regulating portion 30-1 provided at the holder 10, so that the operation of the switch 13 can be ensured within the holder 10 regardless of variations in the link 11 and the front cover 2, so that the device may have higher reliability. Furthermore, variations in the link 11 and the front cover 2 can be absorbed in the elongate hole 11-21 provided at the first fulcrum forming portion, so that the degree of freedom in designing can be improved.

The switch operation portion 31-6 of the link 11 does not advance beyond the switch regulating portion 30-1 of the holder 10, and therefore force applied on the switch 13 is constant regardless of the operation speed or the operation force of the front cover 2, so that the switch 13 can be prevented from being damaged.

A constant pushing amount can always be secured only by managing the switch positioning portion of the holder 10 that holds the switch 13 and the switch regulating portion 30-1 that regulates the switch lever 13-1, and therefore the management cost for parts can be reduced.

According to the embodiments, the swinging direction of the link 11 is in the direction orthogonal to the opening-closing direction of the front cover 2, space can be saved in the front-back direction of the apparatus main body 1, and the degree of freedom in designing can be improved.

In addition, the position to which the link 11 is pushed is determined by the position of the pressing rib 2-1*a* provided at the side surface of the striking portion 2-1 of the front cover 2 and less likely to be affected by variations in the opening-closing direction of the front cover 2. Therefore, the elongate hole 11-21 for absorbing overstroke can be small, which can save more space and improve the degree of freedom in designing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Application No. 2017-006182, filed on Jan. 17, 2017, and Japanese Patent Application No. 2017-215704, filed on Nov. 8, 2017, which are hereby incorporated by reference herein in their entirety.

What is claimed is:

1. An opening-closing member detecting device that operates a switch with an opening-closing operation of an opening-closing member and detects an opened-closed state of the opening-closing member,
   the opening-closing member detecting device comprising:
   (a) a frame that supports the switch;
   (b) a link provided between the opening-closing member and the switch; and
   (c) an urging member for urging the link,
   the link having a first fulcrum forming portion supported at a first support portion of the frame to form a first fulcrum, a power-point portion pushed by the opening-closing member, a second fulcrum forming portion supported at a second support portion of the frame to form a second fulcrum, and a switch operation portion that presses the switch,
   the frame having a regulating portion that regulates movement of the switch operation portion in a direction of pressing the switch,
   the first fulcrum forming portion being separable with respect to the first support portion, and the urging member urging the first fulcrum forming portion toward the first support portion, and
   the link being pushed at the power-point portion by the opening-closing member to move in a direction, in which the switch operation portion presses the switch, around the first fulcrum serving as a fulcrum,
   wherein movement of the switch operation portion in a direction of pressing the switch is regulated by the regulating portion, with the link being pushed at the power-point portion by the opening-closing member to move around the second fulcrum serving as a fulcrum in a direction of separating the first fulcrum forming portion from the first support portion against the urging member.

2. The opening-closing member detecting device according to claim 1, wherein the frame includes a positioning portion that positions the switch.

3. The opening-closing member detecting device according to claim 1, wherein the opening-closing member includes a striking portion that abuts against the power-point portion.

4. The opening-closing member detecting device according to claim 1, wherein the second fulcrum forming portion is provided between the power-point portion and the first fulcrum forming portion.

5. The opening-closing member detecting device according to claim 4, wherein the first fulcrum forming portion includes an elongate hole, the first support portion includes a first fulcrum shaft engaged with the elongate hole, and the first fulcrum shaft abuts against an end of the elongate hole on the opening-closing member side to form the first fulcrum.

6. The opening-closing member detecting device according to claim 5, wherein the elongate hole provided at the first fulcrum forming portion is a U-shaped groove opened on an opposite side to the opening-closing member side.

7. The opening-closing member detecting device according to claim 4, wherein the second fulcrum forming portion is a second fulcrum shaft provided at the link, the second support portion provided at the frame includes a holding portion that includes a concave groove with which the second fulcrum shaft is engaged, and the concave groove is open to the opening-closing member side.

8. The opening-closing member detecting device according to claim 4, wherein the switch and the link are provided on front and back sides of a partition formed by the frame.

9. The opening-closing member detecting device according to claim 8, wherein the switch operation portion includes an operation shaft that extends coaxially with the second fulcrum shaft and protrudes to the switch side through a regulating elongate hole provided at the partition, and an end of the regulating elongate hole on the switch side forms the regulating portion.

10. The opening-closing member detecting device according to claim 1, wherein the power-point portion is provided between the first fulcrum forming portion and the second fulcrum forming portion.

11. The opening-closing member detecting device according to claim 10, wherein the regulating portion supports the switch operation portion while movement of the switch operation portion is regulated by the regulating portion, so that the regulating portion and the switch operation portion form the second fulcrum as the second support portion and the second fulcrum forming portion, respectively.

12. The opening-closing member detecting device according to claim 11, wherein the switch has a switch lever that switches between on and off states, depending on a swinging position, and wherein the switch lever is pressed by the switch operation portion to swing and has the swinging position regulated by the regulating portion.

13. The opening-closing member detecting device according to claim 11, wherein, when the link is pushed at the power-point portion by the opening-closing member to move in a direction of separating the first fulcrum forming portion from the first support portion, the following relational expression is established:

$$Pa \times La < Pb \times Lb$$

where a force applied to the link from the regulating portion side is Pa, a distance from the power-point portion to Pa is La, a force applied to the link by the urging member is Pb, and a distance from the power-point portion to Pb is Lb.

14. The opening-closing member detecting device according to claim 10, wherein the first fulcrum forming portion includes an elongate hole, the first support portion includes a first fulcrum shaft engaged with the elongate hole, and the first fulcrum shaft abuts against an end of the elongate hole on the switch side to form the first fulcrum.

15. The opening-closing member detecting device according to claim 14, wherein the elongate hole provided at the first fulcrum forming portion is a U-shaped groove opened on an opposite side to the switch side.

16. The opening-closing member detecting device according to claim 10, wherein the link pivots in a direction orthogonal to the opening-closing direction of the opening-closing member.

17. The opening-closing member detecting device according to claim 10, wherein the urging member is provided between the first fulcrum forming portion and the power-point portion.

18. An image forming apparatus including an image forming portion that forms an image on a recording medium, the image forming apparatus comprising:

an apparatus main body storing the image forming unit;
an opening-closing member provided at the apparatus main body in an openable-closable manner; and
the opening-closing member detecting device of claim 1 as an opening-closing member detecting device that detects an opened-closed state of the opening-closing member.

19. An opening-closing member detecting device that operates a switch with an opening-closing operation of an opening-closing member and detects an opened-closed state of the opening-closing member, the opening-closing member detecting device comprising:
(a) a frame that holds the switch;
(b) a link provided between the opening-closing member and the switch; and
(c) an urging member for urging the link,
the link having a first fulcrum forming portion supported at a first support portion of the frame to form a first fulcrum, a power-point portion pushed by the opening-closing member, a second fulcrum forming portion (i) provided between the first fulcrum forming portion and the power-point portion and (ii) supported at a second support portion of the frame to form a second fulcrum, and a switch operation portion that presses the switch,
the first fulcrum forming portion being separable to the opening-closing member side with respect to the first support portion, and the urging member urging the first fulcrum forming portion toward the first support portion, and
the switch operation portion being provided in a position of the second fulcrum forming portion.

20. An opening-closing member detecting device that operates a switch with an opening-closing operation of an opening-closing member and detects an opened-closed state of the opening-closing member, the opening-closing member detecting device comprising:
(a) a frame that holds the switch;
(a) link provided between the opening-closing member and the switch; and
(c) an urging member for urging the link,
the link having a first fulcrum forming portion supported at a first support portion of the frame to form a first fulcrum, a switch operation portion that presses the switch, and a power-point portion (i) provided between the first fulcrum forming portion and the switch operation portion and (ii) pushed by the opening-closing member,
the first fulcrum forming portion being separable with respect to the first support portion, and the urging member urging the first fulcrum forming portion toward the first support portion, and
the frame having a regulating portion that regulates movement of the switch operation portion in a direction of pressing the switch.

* * * * *